(12) United States Patent
    Brabec et al.

(10) Patent No.: US 12,603,905 B2
(45) Date of Patent: Apr. 14, 2026

(54) DETECTING MULTI-SEGMENT MALICIOUS EMAIL ATTACKS

(71) Applicant: Cisco Technology, Inc., San Jose, CA (US)

(72) Inventors: Jan Brabec, Prague (CZ); Tomas Sixta, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 275 days.

(21) Appl. No.: 18/192,236

(22) Filed: Mar. 29, 2023

(65) Prior Publication Data

US 2024/0333738 A1    Oct. 3, 2024

(51) Int. Cl.
    *H04L 9/40*            (2022.01)

(52) U.S. Cl.
    CPC ...... *H04L 63/1425* (2013.01); *H04L 63/1416* (2013.01)

(58) Field of Classification Search
    CPC ........................ H04L 63/1425; H04L 63/1416
    USPC ........................................................... 726/23
    See application file for complete search history.

(56) References Cited

U.S. PATENT DOCUMENTS

| | | | | |
|---|---|---|---|---|
| 8,601,064 | B1 * | 12/2013 | Liao ...................... | H04L 51/212 |
| | | | | 709/206 |
| 10,834,127 | B1 * | 11/2020 | Yeh ...................... | G06N 3/0475 |
| 11,075,930 | B1 * | 7/2021 | Xavier ................... | H04L 63/20 |
| 2020/0067861 | A1 * | 2/2020 | Leddy ................. | G06F 21/6245 |
| 2020/0084228 | A1 * | 3/2020 | Goutal ................ | H04L 63/1483 |
| 2020/0344251 | A1 * | 10/2020 | Jeyakumar ............ | H04L 51/212 |
| 2022/0021700 | A1 * | 1/2022 | Devlin .................. | G06N 20/00 |
| 2022/0086179 | A1 * | 3/2022 | Levin .................... | H04W 12/63 |
| 2022/0230142 | A1 * | 7/2022 | Batchu ................. | H04L 51/212 |
| 2022/0255961 | A1 * | 8/2022 | Reiser ................ | H04L 63/1425 |
| 2022/0286432 | A1 * | 9/2022 | Chechik ............... | H04L 63/102 |

FOREIGN PATENT DOCUMENTS

EP            4044503            8/2022

* cited by examiner

*Primary Examiner* — Badrinarayanan
(74) *Attorney, Agent, or Firm* — Lee & Hayes, P.C.

(57)            ABSTRACT

A method to perform the techniques described herein includes receiving a first email from a first sender to a first receiver. The method may include determining a first maliciousness prediction that indicates a first likelihood that the first email is malicious. The method may include determining that the first maliciousness prediction fails to satisfy a maliciousness pattern associated with malicious emails. The method may include receiving a second email from the first sender to the first receiver. The method may include determining that the first email and second email were received within a threshold period of time. The method may include determining an overall maliciousness prediction that indicates an overall likelihood that the first email and second email in combination are malicious. The method may include determining that the overall maliciousness prediction satisfies the maliciousness pattern.

15 Claims, 7 Drawing Sheets

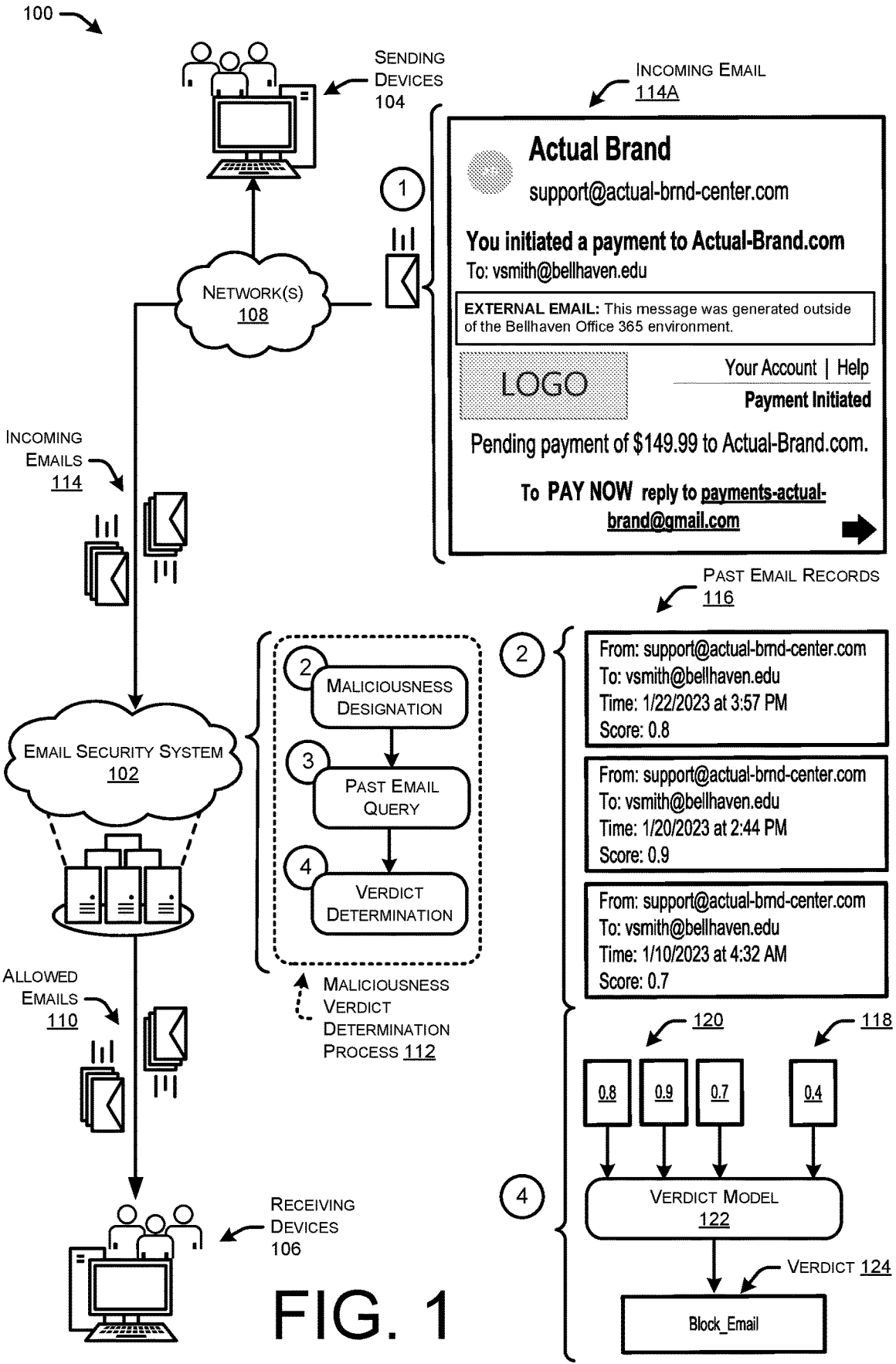

100

SENDING
DEVICES
104

INCOMING EMAIL
114A

NETWORK(S)
108

Actual Brand support@actual-brnd-center.com

You initiated a payment to Actual-Brand.com
To: vsmith@bellhaven.edu

EXTERNAL EMAIL: This message was generated outside of the Bellhaven Office 365 environment.

LOGO          Your Account | Help
              Payment Initiated

Pending payment of $149.99 to Actual-Brand.com.

To PAY NOW reply to payments-actual-brand@gmail.com

INCOMING
EMAILS
114

PAST EMAIL RECORDS
116

EMAIL SECURITY SYSTEM
102

② MALICIOUSNESS DESIGNATION

③ PAST EMAIL QUERY

④ VERDICT DETERMINATION

MALICIOUSNESS
VERDICT
DETERMINATION
PROCESS 112

② From: support@actual-brnd-center.com
To: vsmith@bellhaven.edu
Time: 1/22/2023 at 3:57 PM
Score: 0.8

From: support@actual-brnd-center.com
To: vsmith@bellhaven.edu
Time: 1/20/2023 at 2:44 PM
Score: 0.9

From: support@actual-brnd-center.com
To: vsmith@bellhaven.edu
Time: 1/10/2023 at 4:32 AM
Score: 0.7

ALLOWED
EMAILS
110

120                    118

0.8  0.9  0.7        0.4

④ VERDICT MODEL
122

RECEIVING
DEVICES
106

VERDICT 124

Block_Email

PROCESSOR(S) 202

NETWORK INTERFACE(S) 204

COMPUTER-READABLE MEDIA 206

PREDICTION COMPONENT
208

DATABASE MANAGEMENT
COMPONENT
210

VERDICT DETERMINATION
COMPONENT
212

ACTION COMPONENT
214

STORAGE 222

MALICIOUSNESS
PATTERN(S)
216

MALICIOUSNESS DETECTOR
MODEL(S)
218

EMAIL RECORD DATABASE
220

EMAIL SECURITY SYSTEM
102

300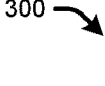

```
┌─────────────────────────────────┐
│       RECEIVE INCOMING EMAIL     │
│               302                │
└─────────────────────────────────┘
                │
                ▼
┌─────────────────────────────────┐
│  DETERMINE MALICIOUSNESS PREDICTION │
│               304                │
└─────────────────────────────────┘
                │
                ▼
┌─────────────────────────────────┐
│   STORE MALICIOUSNESS PREDICTION │
│               306                │
└─────────────────────────────────┘
                │
                ▼
```

┌──────────────────────────────────┐                              ◇ PAST EMAIL
│ DETERMINE RELATED MALICIOUSNESS    │  ◄── YES ───    RECORDS?
│           PREDICTIONS              │                    308
│               312                  │
└──────────────────────────────────┘

NO

┌──────────────────────────────────┐                ┌──────────────────────────────────┐
│ COMBINE PREDICTIONS TO DETERMINE A │                │ DETERMINE A VERDICT BASED ON THE   │
│             VERDICT                │                │    MALICIOUSNESS PREDICTION        │
│               314                  │                │               310                  │
└──────────────────────────────────┘                └──────────────────────────────────┘

┌──────────────────────────────────────┐
│ ROUTE THE INCOMING EMAIL BASED ON THE  │
│               VERDICT                  │
│                 316                    │
└──────────────────────────────────────┘

FIG. 3

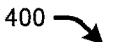
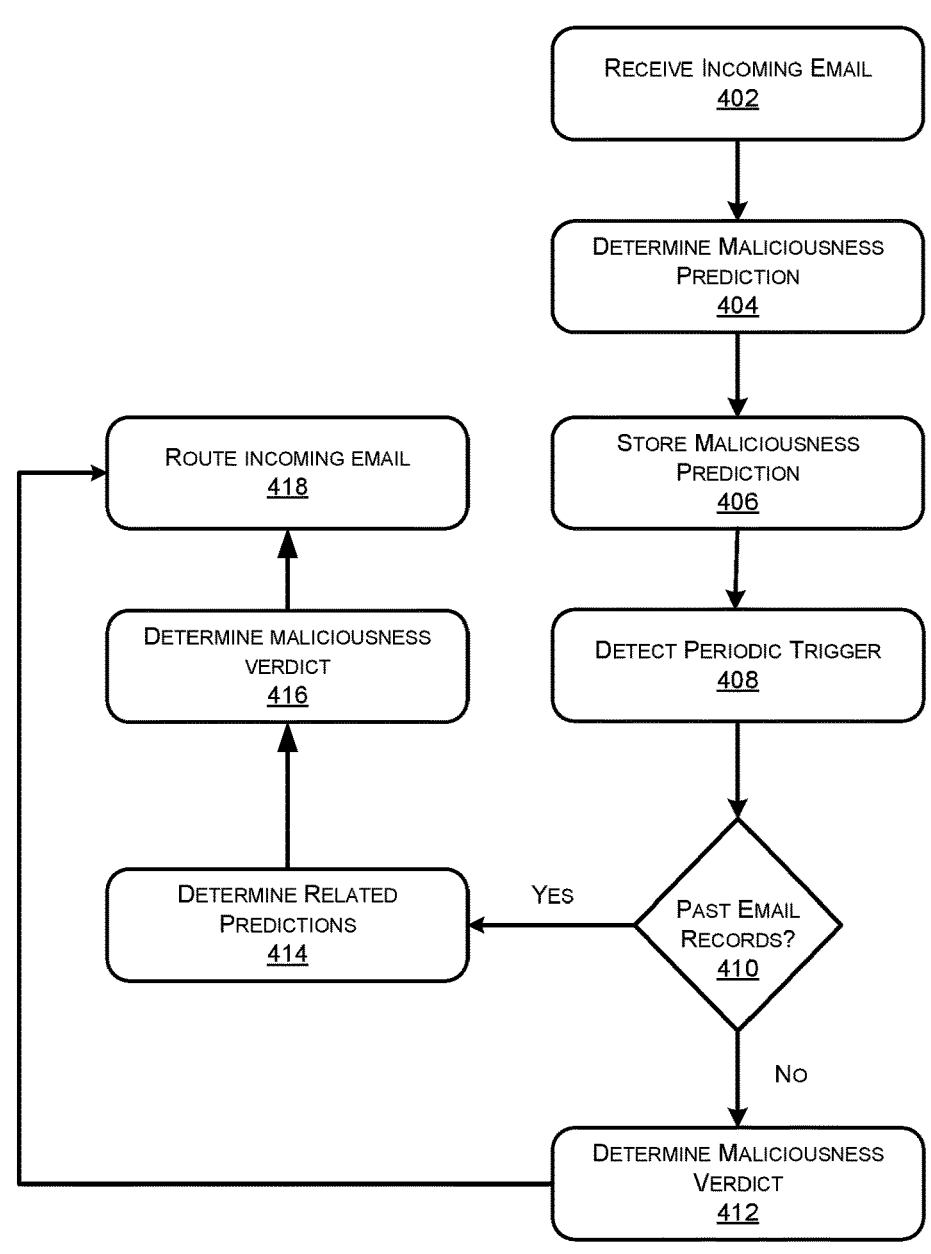
FIG. 4

500

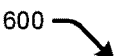
600
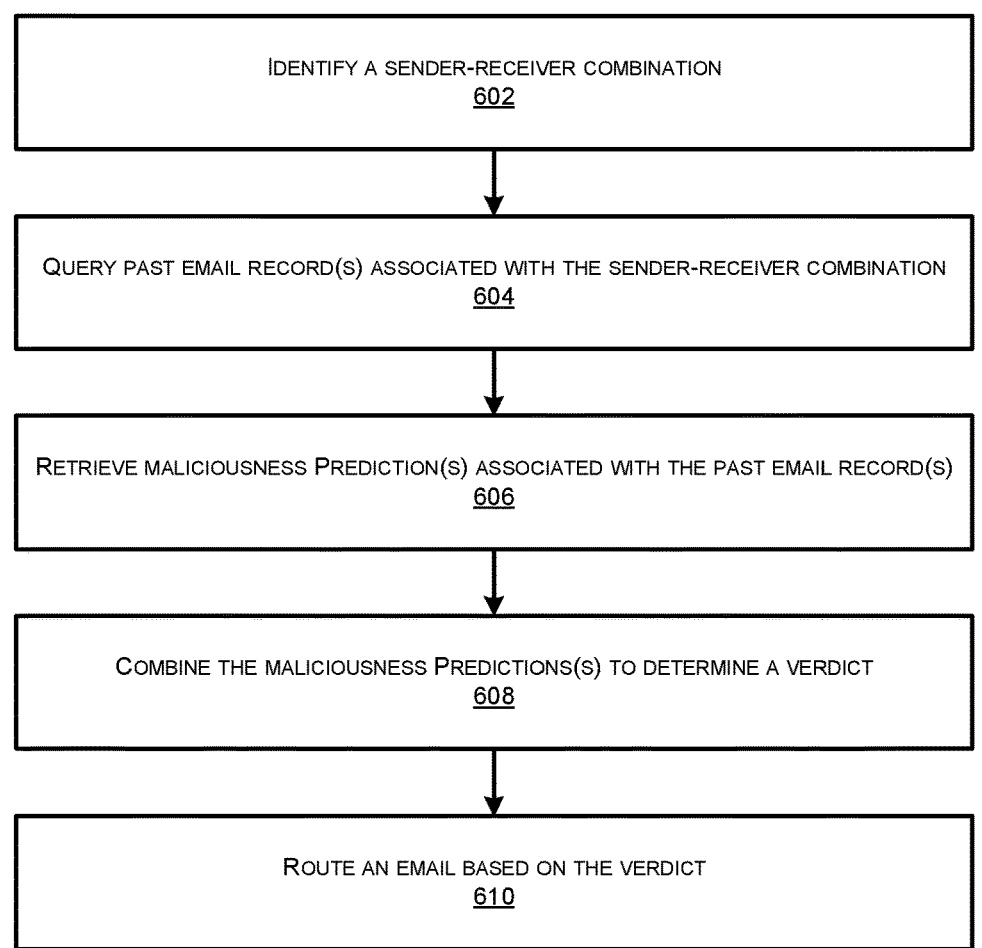
IDENTIFY A SENDER-RECEIVER COMBINATION
602
QUERY PAST EMAIL RECORD(S) ASSOCIATED WITH THE SENDER-RECEIVER COMBINATION
604
RETRIEVE MALICIOUSNESS PREDICTION(S) ASSOCIATED WITH THE PAST EMAIL RECORD(S)
606
COMBINE THE MALICIOUSNESS PREDICTIONS(S) TO DETERMINE A VERDICT
608
ROUTE AN EMAIL BASED ON THE VERDICT
610
FIG. 6

DETECTING MULTI-SEGMENT MALICIOUS EMAIL ATTACKS

TECHNICAL FIELD

The present disclosure relates generally to techniques for an email security system to detect malicious email attacks.

BACKGROUND

Electronic mail, or "email," continues to be a primary method of exchanging messages between users of electronic devices. Many email service providers have emerged that provide users with a variety of email platforms to facilitate the communication of emails via email servers that accept, forward, deliver, and store messages for the users. Email continues to be an important and fundamental method of communications between users of electronic devices as email provide users with a cheap, fast, accessible, efficient, and effective way to transmit all kinds of electronic data. Email is well established as a means of day-to-day, private communication for business communications, marketing communications, social communications, educational communications, and many other types of communications.

Due to the widespread use and necessity of email, scammers and other malicious entities use email as a primary channel for attacking users, such as by business email compromise (BEC) attacks, malware attacks, and malware-less attacks. These malicious entities continue to employ more frequent and sophisticated social-engineering techniques for deception and impersonation (e.g., phishing, spoofing, etc.). As users continue to become savvier about identifying malicious attacks on email communications, malicious entities similarly continue to evolve and improve methods of attack.

Accordingly, email security platforms are provided by email service providers (and/or third-party security service providers) that attempt to identify and eliminate attacks on email communication channels. For instance, cloud email services provide secure email gateways (SEGs) that monitor emails and implement pre-delivery protection by blocking email-based threats before they reach a mail server. These SEGs can scan incoming, outgoing, and internal communications for signs of malicious or harmful content, signs of social engineering attacks such as phishing or business email compromise, signs of data loss for compliance and data management, and other potentially harmful communications of data. However, with the rapid increase in the frequency and sophistication of attacks, it is difficult for email service providers to maintain their security mechanisms at the same rate as the rapidly changing landscape of malicious attacks on email communications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 illustrates a system architecture of an example email security system.

FIG. 3 is a flowchart diagram of an example process for routing an incoming email by determining a maliciousness verdict based on receiving the incoming email.

FIG. 4 is a flowchart diagram of an example process for routing an incoming email based a maliciousness verdict for the incoming email whose determination is triggered periodically.

FIG. 6 is a flowchart diagram of an example process of routing an email based on past email records associated with a sender-receiver combination for the email.

DESCRIPTION OF EXAMPLE EMBODIMENTS

Overview

Figure 2:
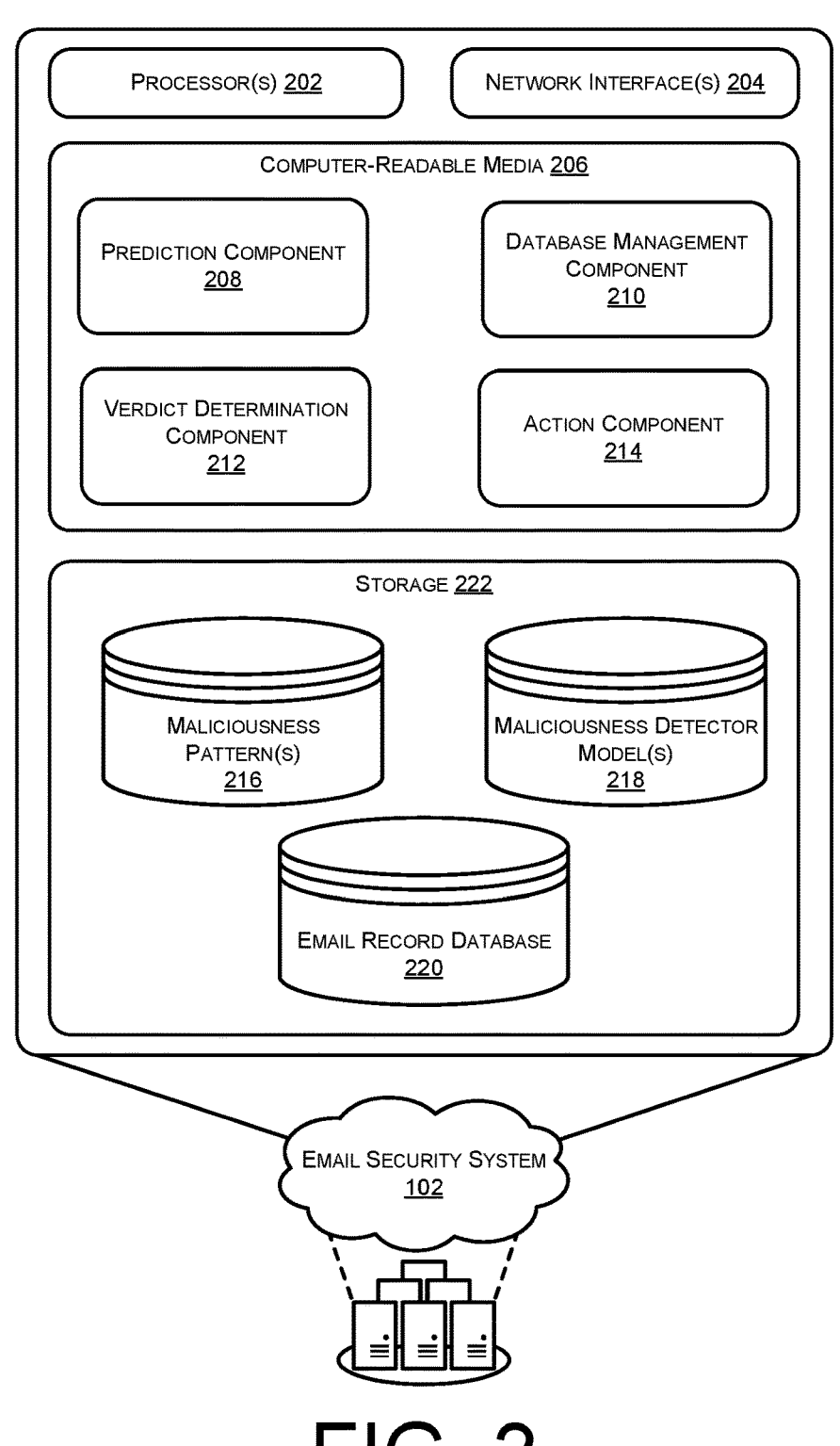
FIG. 2 illustrates a component diagram of an example email security system.

This disclosure describes techniques for an email security system to detect multi-stage malicious email attacks, such as multi-stage email scam attacks, and perform remedial actions based on such detections. A method to perform the techniques described herein may include receiving a first email from a first sender to a first receiver. The method may further include determining a first maliciousness prediction that indicates a first likelihood that the first email is malicious. The method may further include determining that the first maliciousness prediction fails to satisfy a maliciousness pattern associated with malicious emails. The method may further include receiving a second email from the first sender to the first receiver. The method may further include determining that the first email and second email were received within a threshold period of time. The method may further include, based at least in part on the first email and second email being received from the first sender and to the first receiver and within the threshold period of time, determining an overall maliciousness prediction that indicates an overall likelihood that the first email and second email in combination are malicious. The method may further include determining that the overall maliciousness prediction satisfies the maliciousness pattern.

In some cases, a method to perform techniques discussed herein may include querying a first database to retrieve a first record associated with a first sender-receiver combination, wherein the first sender-receiver combination comprises a first sender and a first receiver, and wherein the first record represents a first maliciousness designation for a first past email that was previously sent by the first sender to the first receiver. The method may further include determining a maliciousness verdict for the first sender-receiver combination based on the first maliciousness designation. The method may further include processing an incoming email based on the maliciousness verdict, wherein the incoming email is from the first sender and to the first receiver.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for an email security system to detect a multi-stage malicious email attack and take remedial actions to address the detected attack. The techniques described herein may be implemented in any email security system that is configured to generate a maliciousness prediction for a single email to enable the email security system to generate an overall maliciousness prediction for a combination of emails. For example, in some cases, the email security system is configured to determine a maliciousness verdict for a first email based on a maliciousness prediction for the first email and a maliciousness prediction for a second email that is sent from the same sender and to the same receiver. In some cases, the maliciousness verdict for an email indicates whether the email is predicted to be associated with a malicious email attack and/or a recommended remedial action for the email security system to perform in relation to the email. Examples of remedial actions include blocking the email from being provided to the receiver and/or displayed in an inbox of the receiver, harvesting data about a malicious email to generate a maliciousness detector model, storing attacker data associated with a malicious email in a blacklist associated with the email security system, reporting attacker data associated with a malicious email to authorities, and/or the like.

Many malicious email attacks, such as many BEC spam attacks, are multi-stage attacks that include a sequence of two or more attacks. For example, in a multi-stage BEC spam attack, the attacker may first send a fake email to the victim who is an employee in an organization. This fake email may impersonate a real person who is also a legitimate employee of an organization to build a rapport and an official tone to the message. Once the victim succumbs to the scam and responds to the initial scam email, the attacker may then send a subsequent email usually with directions on how to, for example, transfer money to the attacker, either in the form of transfer to a bank account or sending gift card credentials to an email address. BEC scam emails include various types or classes, such as wire-transfer scams, gift card scams, payroll scams, invoice scams, acquisition scams, aging report scams, phone scams, a W-2 scam class, an aging report scam class, a merger and acquisition scam class, an executive forgery scam class, an attorney scam class, a tax client scam, an initial lure or rapport scam class, and so forth. In some instances, the scam attacks result in an organization or person under attack losing money or other financial resources. Additionally, or alternatively, the organization or person under attack may lose valuable information, such as trade secrets or other information.

Accordingly, to properly detect and respond to a multi-stage malicious email attack based on an incoming email, an email security system should perform a cross-email inference based on data associated with the incoming email and data associated with a subset of past emails that are determined to be related to the incoming email. In addition, it is important that the email security system performs such a cross-email inference in a computationally efficient and speedy manner to avoid excessively undermining real-time and/or near-real-time delivery requirements of an email platform that is associated with the email security system. Performing a cross-email inference in a computationally efficient and speedy manner may be challenging because many emerging techniques for detecting a malicious email utilize computationally complex operations, such as operations that use deep learning models, natural language processing models, probabilistic inference models, and/or the like. In some cases, it is important that, to determine whether an incoming email is part of a multi-stage malicious attack in a computationally efficient and expedient manner, the number of computationally complex operations that are performed by the email security system after receiving the incoming email is reduced and/or kept to a minimum.

In some cases, the email security system avoids the need for performing any complex maliciousness detection operations on a past email after an incoming email is received by storing a previously-determined maliciousness prediction for the past email on an email record database. After the incoming email is received, the maliciousness prediction that is stored on the database can then be retrieved and used to determine a maliciousness verdict for the past email.

For example, in some cases, after the email security system determines a maliciousness prediction for a first email, the maliciousness prediction stores the maliciousness prediction on the email record database. Accordingly, the email record database may indicate maliciousness predictions for a set of past emails. In some cases, after the email security system receives a second email, the email security system retrieves the maliciousness predictions for a subset of the past emails that are determined to be related to the second email from the database. In some cases, the email security system determines the maliciousness verdict for the second email based on the retrieved maliciousness predictions. As this example illustrates, by storing a previously-determined maliciousness prediction for a past email on the email record database and retrieving the stored prediction after an incoming email is received, the email security system avoids the need for determining the maliciousness prediction for the past email in real-time after the incoming email is received. In some cases, retrieving a previously-determined maliciousness prediction for a past email is less computationally expensive and faster than determining the maliciousness prediction in real-time. Accordingly, by substituting a real-time determination of a maliciousness prediction with a real-time retrieval of a previously-determined maliciousness prediction, the techniques described herein enhance the real-time efficiency and speed of the email security system.

For example, in some cases, the email security system is configured to receive a first email that is sent from a first sender and destined for a first receiver. In some cases, subsequent to receiving the first email, the email security system determines a first maliciousness prediction for the first email that indicates a likelihood that the first email is maliciousness. Subsequently, the email security system may determine whether the first maliciousness prediction satisfies a maliciousness condition associated with malicious emails. In some cases, the email security system then receives a second email that is also sent from the first sender and destined for the first server. In some cases, the first email is determined to be received at a first time that is within a threshold period time from a second time at which the second email is determined to be received. In some cases, subsequent to receiving the second email, the email security system determines an overall maliciousness prediction that indicates an overall likelihood that the first email and the second email in combination are malicious. In some cases, the email security system determines a maliciousness verdict for the second email based on the overall maliciousness prediction.

As another example, in some cases, an email security system determines a maliciousness verdict for an incoming email based on a maliciousness prediction for the incoming email and a maliciousness prediction for a past email. In some cases, the incoming email and the past email are both sent from the same sender and sent to the same receiver. In some cases, the incoming email and the past email are determined to be received within a threshold time period. In some cases, when the email security system receives a first email that is sent from a first sender to a first receiver, the email security system retrieves all of the maliciousness predictions associated with a subset of past emails that are sent from the first sender to the first receiver from an email record database. In some of those cases, the email security system combines the retrieved maliciousness predictions for the subset of past emails and a maliciousness prediction for the first email to determine a maliciousness verdict for the first email. In some cases, the email security system removes the maliciousness prediction of a past email from the email record database when the email security system determines that the past email is associated with a receipt time that is earlier than a defined time in the past (e.g., three months before a current time at which the email security system is making the determination).

In some cases, the techniques described herein include determining a maliciousness prediction for an email. In some cases, the maliciousness prediction for a corresponding email indicates a likelihood that a corresponding email is malicious. For example, the maliciousness prediction may indicate a predicted likelihood that the corresponding email is malicious as determined using one or more maliciousness detector models. The maliciousness prediction may be a discrete (e.g., Boolean) value, a continuous value, or a vector including at least one discrete value and/or at least one continuous value. In some cases, the maliciousness prediction for an email is determined after the email is received. In some cases, the maliciousness prediction for an email is determined periodically (e.g., every minute), for example by determining the maliciousness predictions for a set of emails received during a relevant period (e.g., the last minute) after a periodic trigger is activated.

In some cases, a maliciousness prediction is determined based on the output of processing data associated with a corresponding email using at least one maliciousness detector model. A maliciousness detector model may be a computer-implemented routine that is configured to determine an output indicating whether feature data associated with an email indicates that the email is malicious, a predicted likelihood that the email is malicious as determined based on the feature data, whether feature data associated with the email indicates that the email satisfies a maliciousness pattern, and/or a predicted likelihood that the email satisfies the maliciousness pattern based on the feature data. For example, a first maliciousness detector model may determine an output indicating whether text of an email includes a word from a suspicious word list, a second maliciousness detector may determine an output indicating whether the markup payload (e.g., Hyper-Text Markup Language (HTML) payload) of an email includes an image that is included using style sheet code (e.g., Cascading Style Sheet (CSS) code), a third maliciousness detector model may determine an output indicating a likelihood that an email is malicious as determined by processing text data associated with the email using a natural language processing model, and a fourth maliciousness detector model may determine an output describing a likelihood that an email is malicious as determined by processing image data associated with the email using an image processing model (e.g., a convolutional neural network model).

In some cases, given D maliciousness detector models used to determine a maliciousness prediction for an email, the maliciousness prediction for the email includes a single score (e.g., a discrete or continuous score) determined by aggregating the D maliciousness detector models. The aggregation may be performed using an ensemble model. In some cases, given D maliciousness detector models used to determine a maliciousness prediction for an email, the maliciousness prediction for the email includes D scores each determined based on the output of a respective one of the D maliciousness detector models. In some cases, given D maliciousness detector models used to determine a maliciousness prediction for an email, the maliciousness prediction for the email includes: (i) D scores each determined based on the output of a respective one of the D maliciousness detector models, and (ii) a single score (e.g., a discrete or continuous score) determined by aggregating the D maliciousness detector models. In some cases, given D maliciousness detector models used to determine a maliciousness prediction for an email, the maliciousness prediction for the email includes a vector of size E that is determined by processing the D outputs of the D maliciousness detector models using a machine learning model that is configured to determine an E-sized (e.g., a dimensionality-reduced) transformed representation of the D outputs.

In some cases, the techniques described herein include maintaining an email record database that indicates a maliciousness prediction for a past email. In some cases, each record of the database is associated with a corresponding email and indicates at least one of the following: (i) a sender associated with the corresponding email, (ii) a receiver associated with the corresponding email, (iii) a timestamp (e.g., a sending timestamp or a receiving timestamp) associated with the corresponding email, or (iv) a maliciousness prediction associated with the corresponding email. In some cases, after the email security system receives a first email, the email security system determines a maliciousness prediction for the first email and subsequently stores a new record in the database that indicates the maliciousness prediction of the first email (e.g., along with the sender of the first email, the receiver of the first email, and/or the timestamp of the first email). Accordingly, in some cases, the email record database is a repository of previously-determined maliciousness predictions that the email security system can use to update a maliciousness prediction for a future email.

In some cases, the email security system enforces a policy to manage the number of records stored on the email record database by removing records when one or more predefined removal criteria are met. One objective of such a policy may be to put an upper limit on the number of database retrieval operations that may be performed after an incoming email is received, thus further enhancing real-time efficiency and speed of the email security system. Another objective of such a policy may be to remove records pertaining to excessively old emails that may not be relevant to recent events.

For example, in some cases, the email record database may only include records corresponding to past emails that are determined to be received after a defined time in the past (e.g., during the last three months before a current time associated with the determination). In some cases, when the email security system determines that a first email is received at a first time that is earlier than a defined time in the past (e.g., three months before a current time associated with the determination), the email security system removes the record associated with the first email from the email record database. As another example, in some cases, the email record database may only allow storing up to N (e.g., 10,000) records, such that adding an (N+1)th record requires removing the record corresponding to an email that is determined to be received earlier than all other emails associated with the other (N−1) records in the database.

In some cases, the email record database includes a set of records each associated with a corresponding email and indicating a maliciousness prediction for the corresponding email. In some cases, each record of the email record database indicates a sender of the corresponding email, a receiver of the corresponding email, a timestamp (e.g., a sending timestamp, a receipt timestamp, and/or the like) of the corresponding email, and a maliciousness prediction of the corresponding email. In some cases, the maliciousness prediction indicates a likelihood that a corresponding email is malicious. In some cases, the maliciousness prediction includes a score (e.g., a Boolean score, a continuous score, and/or the like) that describes a predicted likelihood that the corresponding email is malicious. In some cases, the maliciousness prediction includes a vector that describes D values, where each of the D vector values is associated with a corresponding one of D maliciousness detector models and describes an output (e.g., a Boolean output, a continuous output, and/or the like) of the corresponding maliciousness detector model with respect to the corresponding email.

In some cases, the email record database is updated each time an email is received. In some cases, after an email is received, the email security system determines a maliciousness prediction for the received email and stores the maliciousness prediction in the email record database (e.g., as part of a record associated with the received email). In some cases, the email record database is updated periodically. In some cases, after an email is received, the email security system stores the email in an email repository database. In some cases, periodically (e.g., every ten seconds), the email security system retrieves an email that is stored in the email repository database, determines a maliciousness prediction for the retrieved email, stores the determined maliciousness prediction in the email record database, and removes the noted email from the email repository database.

In some cases, the techniques described herein include using an email record database to determine a maliciousness verdict for a first email (e.g., an incoming email). In some cases, to determine a maliciousness verdict for the first email, the email security system retrieves a record of the email record database that is associated with a related email and uses the retrieved record to determine the maliciousness prediction for the related email. In some cases, the email security system determines the maliciousness verdict for the first email by combining the maliciousness predictions for all of the past emails that are determined to be related to the first email, using records retrieved from the email record database. In some cases, the email security system determines the maliciousness verdict for the first email by combining: (i) the maliciousness predictions for all of the past emails that are determined to be related to the first email, as retrieved from the email record database, and (ii) the maliciousness prediction for the first email, as either retrieved from the email record database or as determined during runtime of a computer-implemented routine triggered by the receipt of the first email.

In some cases, the maliciousness verdict for a first email is determined based on (e.g., in response to) receiving the email. In some cases, once the first email is received, the email security system: (i) determines a maliciousness prediction for the first email, (ii) retrieves any maliciousness predictions associated with related past emails from the email record database, and (iii) combines the maliciousness predictions obtained in (i)-(ii) to determine the maliciousness verdict for the first email. In some cases, the maliciousness verdict for a first email is determined based on (e.g., in response to) detecting a periodic trigger. In some cases, once the first email is received, the email security system determines the maliciousness prediction for the first email and stores the maliciousness prediction on the email record database. In some cases, once the periodic trigger is detected (e.g., every minute), the email security system: (i) retrieves the maliciousness prediction for the first email from the email record database, (ii) retrieves any maliciousness predictions associated with related past emails from the email record database, and (iii) combines the maliciousness predictions retrieved in (i)-(ii) to determine the maliciousness verdict for the first email and/or for the first email and the related past emails collectively.

In some cases, two emails are determined to be related if they are sent by the same sender and to the same receiver. Accordingly, in some cases, to determine a maliciousness verdict for a first email from a first sender and to a first receiver, the email security system retrieves each maliciousness prediction that is stored on the email record database and that is associated with a past email sent from the first sender and to the first receiver. In some cases, after an incoming email from a first sender and to a first receiver is received, the email security system queries the email record database for all records associated with emails from the first sender and to the first receiver. In some cases, after obtaining the queried records, the email security system combines the maliciousness predictions in those records (e.g., along with a maliciousness prediction that is determined for the incoming email specifically) to determine a maliciousness verdict for the incoming email. In some cases, two emails are determined to be related if they are sent by the same sender and to the same receiver, and if they are sent and/or received within a threshold period of time from one another.

In some cases, the techniques described herein include determining a maliciousness verdict for an email based on the maliciousness prediction for that email and the maliciousness predictions for past emails that are determined to be related to the email. In some cases, by integrating predictive insights indicated by maliciousness predictions of past related emails into the process for determining a maliciousness verdict for an email, the techniques described herein enable determining an overall maliciousness prediction that indicates whether the combination of the emails constitute a multi-stage malicious attack. In some cases, the email security system can then use the overall maliciousness prediction to determine a maliciousness verdict for the email. In some cases, the maliciousness verdict for an email indicates whether the email is predicted to be associated with a malicious email attack and/or a recommended remedial action for the email security system to perform in relation to the email. Examples of remedial actions include blocking the email from being displayed in an inbox of the receiver, harvesting data about a malicious email to generate a maliciousness detector model, storing attacker data associated with a malicious email in a blacklist associated with the email security system, reporting attacker data associated with a malicious email to authorities, and/or the like.

In some cases, the techniques described herein can improve effectiveness of an email security system by enabling the email security system to detect a multi-stage malicious attack. Without an effective capability to detect malicious attacks, malicious attackers may be able to exploit this weakness of the email security system by sending a sequence of emails that individually will survive malicious email filters. In contrast, by detecting multi-stage malicious attacks, techniques described herein improve effectiveness of an email security system and enhance security of computer systems.

In some cases, the techniques described herein improve computational efficiency and operational speed of an email security system. In some cases, the email security system avoids the need for performing any complex maliciousness detection operations on a past email after an incoming email is received by storing a previously-determined maliciousness prediction for the past email on an email record database. After the incoming email is received, the maliciousness prediction that is stored on the database can then be retrieved and used to determine a maliciousness verdict for the past email. Accordingly, by substituting a real-time determination of a maliciousness prediction with a real-time retrieval of a previously-determined maliciousness prediction, the techniques described herein enhance the real-time efficiency and speed of an email security system.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system architecture 100 of an example email security system 102 that generates a maliciousness verdict for an email and determines whether to perform a remedial action with respect to the email based on the maliciousness verdict of the email.

In some instances, the email security system 102 may be a scalable service that includes and/or runs on devices housed or located in one or more data centers, that may be located at different physical locations. In some examples, the email security system 102 may be included in an email platform and/or associated with a secure email gateway platform. The email security system 102 and the email platform may be supported by networks of devices in a public cloud computing platform, a private/enterprise computing platform, and/or any combination thereof. The one or more data centers may be physical facilities or buildings located across geographic areas that designated to store networked devices that are part of and/or support the email security system 102. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth).

The email security system 102 may be associated with an email service platform may generally comprise any type of email service provided by any provider, including public email service providers (e.g., Google Gmail, Microsoft Outlook, Yahoo! Mail, AIL, etc.), as well as private email service platforms maintained and/or operated by a private entity or enterprise. Further, the email service platform may comprise cloud-based email service platforms (e.g., Google G Suite, Microsoft Office 365, etc.) that host email services. However, the email service platform may generally comprise any type of platform for managing the communication of email communications between clients or users. The email service platform may generally comprise a delivery engine behind email communications and include the requisite software and hardware for delivering email communications between users. For instance, an entity may operate and maintain the software and/or hardware of the email service platform to allow users to send and receive emails, store and review emails in inboxes, manage and segment contact lists, build email templates, manage and modify inboxes and folders, scheduling, and/or any other operations performed using email service platforms.

The email security system 102 may be included in, or associated with, the email service platform. For instance, the email security system 102 may provide security analysis for emails communicated by the email service platform (e.g., as a secure email gateway). As noted above, the second computing infrastructure may comprise a different domain and/or pool of resources used to host the email security system 102.

The email service platform may provide one or more email services to users of user device to enable the user devices to communicate emails over one or more networks 108, such as the Internet. However, the network(s) 108 may generally comprise one or more networks implemented by any viable communication technology, such as wired and/or wireless modalities and/or technologies. The network(s) 108 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 108 may include devices, virtual resources, or other nodes that relay packets from one device to another.

As illustrated, the user devices may include sending devices 104 that send emails and receiving devices 106 that receive the emails. The sending devices 104 and receiving devices 106 may comprise any type of electronic device capable of communicating using email communications. For instance, the devices 104/106 may include one or more of different personal user devices, such as desktop computers, laptop computers, phones, tablets, wearable devices, entertainment devices such as televisions, and/or any other type of computing device. Thus, the user devices 104/106 may utilize the email service platform to communicate using emails based on email address domain name systems according to techniques known in the art.

The email service platform may receive incoming emails 114, such as the incoming email 114A, that are destined for the receiving devices 106 that have access to inboxes associated with destination email addresses managed by, or provided by, the email service platform. That is, emails are communicated over the network(s) 108 to one or more recipient servers of the email service platform, and the email service platform determines which registered user the email is intended for based on email information such as "To," "Cc," Bcc," and the like. In instances where a user of the receiving device 106 have registered for use of the email security system 102, an organization managing the user devices 104/106 has registered for use of the email security system 102, and/or the email service platform itself has registered for use of the email security system 102, the email service platform may provide the appropriate emails for pre-preprocessing of the security analysis process.

In some cases, the email security system 102 may determine a maliciousness verdict for an incoming email 114A using the maliciousness verdict determination process 112.

The maliciousness verdict may then be used to determine whether an incoming email 114A should be blocked or instead should be provided to the receiving devices 106 as an allowed email 110. To determine the maliciousness verdict, the email security system 102 may analyze the email metadata with reference to the security policies to determine whether or not the email metadata violates one or more security policies that indicate the respective email is potentially malicious. In some instances, rule-based heuristics may be developed to identify malicious emails based on different words, patterns, and/or other information included in the emails. As another example, machine learning model (s) may be trained using emails where malicious emails are labeled as malicious and benign or normal emails are labeled as benign. The machine learning model(s) and/or the rule-based heuristics may output probabilities that emails are malicious, or may simply output a positive or negative result as to whether the emails are malicious or not.

As depicted in FIG. 1, at operation (1), the email security system 102 may receive an incoming email 114A. At operation (2), the email security system 102 may determine a maliciousness prediction for an incoming email 114A. In some cases, the maliciousness prediction of an incoming email 114A indicates a likelihood that the incoming email 114A is malicious. For example, the maliciousness prediction may indicate a predicted likelihood that the incoming email 114A is malicious as determined using one or more maliciousness detector models. The maliciousness prediction may be a discrete (e.g., Boolean) value, a continuous value, or a vector including at least one discrete value and/or at least one continuous value. In some cases, the maliciousness prediction for the incoming email 114A is determined after the incoming email 114A is received. In some cases, the maliciousness prediction for the incoming email 114A is determined periodically (e.g., every minute), for example by determining the maliciousness predictions for a set of emails received during a relevant period (e.g., the last minute) after a periodic trigger is last detected.

In some cases, to determine the maliciousness prediction for the incoming email 114A, the email security system 102 uses a set of maliciousness detector models. In some cases, the maliciousness prediction is determined based on the output of processing data associated with the incoming email 114A using at least one maliciousness detector model. In some cases, to determine the maliciousness prediction for an incoming email 114A, the email security system 102 processes feature data associated with the incoming email 114A using a set of maliciousness detector models to obtain a set of corresponding outputs. In some cases, subsequent to obtaining the set of corresponding outputs, the email security system 102 combines and/or aggregates the outputs of the maliciousness detector models to determine the maliciousness prediction for the incoming email.

A maliciousness detector model may be a computer-implemented routine that is configured to determine an output describing whether feature data associated with the incoming email 114A indicates that the incoming email 114A is malicious, a predicted likelihood that the incoming email 114A is malicious as determined based on the feature data, whether feature data associated with the incoming email 114A indicates that the incoming email 114A satisfies a maliciousness pattern, and/or a predicted likelihood that the incoming email 114A satisfies the maliciousness pattern based on the feature data.

For example, a first maliciousness detector model may determine an output describing whether text of the incoming email 114A includes a word from a suspicious word list, a second maliciousness detector may determine an output describing whether the markup payload (e.g., Hyper-Text Markup Language (HTML) payload) of the incoming email 114A includes an image that is included using style sheet code (e.g., Cascading Style Sheet (CSS) code), a third maliciousness detector model may determine an output describing a likelihood that the incoming email 114A is malicious as determined by processing text data associated with the incoming email 114A using a natural language processing model, and a fourth maliciousness detector model may determine an output describing a likelihood that the incoming email 114A is malicious as determined by processing image data associated with the incoming email 114A using an image processing model (e.g., a convolutional neural network model).

In some cases, given D maliciousness detector models used to determine a maliciousness prediction for the incoming email 114A, the maliciousness prediction for the incoming email 114A includes a single score (e.g., a discrete or continuous score) determined by aggregating the D maliciousness detector models. In some cases, given D maliciousness detector models used to determine a maliciousness prediction for the incoming email 114A, the maliciousness prediction for the incoming email 114A includes D scores each determined based on the output of a respective one of the D maliciousness detector models. In some cases, given D maliciousness detector models used to determine a maliciousness prediction for the incoming email 114A, the maliciousness prediction for the incoming email 114A includes: (i) D scores each determined based on the output of a respective one of the D maliciousness detector models, and (ii) a single score (e.g., a discrete or continuous score) determined by aggregating the D maliciousness detector models. In some cases, given D maliciousness detector models used to determine a maliciousness prediction for the incoming email 114A, the maliciousness prediction for the incoming email 114A includes a vector of size E that is determined by processing the D outputs of the D maliciousness detector models using a machine learning model that is configured to determine a transformed representation of the D outputs.

As further depicted in FIG. 1, at operation (3), the email security system 102 may query an email record database to retrieve a set of past email records 116 associated with the incoming email 114A. In some cases, the email security system 102 only performs operation (3) if the maliciousness prediction determined at operation (2) fails to satisfy a maliciousness pattern associated with malicious emails. In some cases, if the maliciousness pattern for an incoming email 114A satisfies the maliciousness pattern, then the incoming email 114A is determined to be malicious and is blocked. some cases, if the maliciousness pattern for an incoming email 114A satisfies the maliciousness pattern, then the email security system 102 determines the maliciousness verdict for the incoming email 114A based on that maliciousness prediction alone (e.g., without using maliciousness predictions for any past emails that are determined to be related to the incoming email 114A).

As described above, at operation (3), the email security system 102 queries the email record database to retrieve the set of past email records 16 that are associated with the incoming email 114A. In some cases, the email security system 102 maintains an email record database that indicates, for each past record that is received after a defined time in the past, the maliciousness prediction for the past email. In some cases, each record of the email record database is associated with a corresponding past email and indicates (e.g., includes) the maliciousness prediction for the corresponding past email. In some cases, the set of past email records 116 includes each record of the email record database that is associated with a corresponding past email determined to be related to the incoming email 114A. In other words, in some cases, if a past email has a corresponding record in the email record database, and if the past email is determined to be related to the incoming email 114A, then the corresponding record is returned as part of the past email records 116.

In some cases, two emails are determined to be related if they are sent by the same sender and to the same receiver. Accordingly, in some cases, to determine a maliciousness verdict for a first email from a first sender and to a first receiver, the email security system 102 retrieves each maliciousness prediction that is stored on the email record database and that is associated with a past email that is sent from the first sender and to the first receiver. Accordingly, in some cases, the past email records 116 associated with the incoming email 114A include each record of the email record database that is associated with an email sent from the same sender as the sender of the incoming email 114A and that is sent to the same receiver as the receiver of the incoming email 114A.

For example, as depicted in FIG. 1, the set of past email records 116 for the incoming email 114A include a first record that is associated with an email sent from support@actual-brnd-center.com, which is the sender of the incoming email 114A, to vsmith@bellhaven.edu, which is the receiver of the incoming email 114A. Moreover, the first record further describes a receipt time of Jan. 22, 2023, at 3:57 PM for the corresponding email as well as a maliciousness prediction of 0.8 score selected from the range [0, 1] for the corresponding email.

As further depicted in FIG. 1, the set of past email records 116 for the incoming email 114A include a second record that is associated with an email sent from support@actual-brnd-center.com, which is the sender of the incoming email 114A, to vsmith@bellhaven.edu, which is the receiver of the incoming email 114A. Moreover, the second record further describes a receipt time of Jan. 20, 2023, at 2:44 PM for the corresponding email as well as a maliciousness prediction of 0.9 score selected from the range [0, 1] for the corresponding email.

As further depicted in FIG. 1, the set of past email records 116 for the incoming email 114A include a third record that is associated with an email sent from support@actual-brnd-center.com, which is the sender of the incoming email 114A, to vsmith@bellhaven.edu, which is the receiver of the incoming email 114A. Moreover, the third record further describes a receipt time of Jan. 10, 2023, at 4:32 PM for the corresponding email as well as a maliciousness prediction of 079 score selected from the range [0, 1] for the corresponding email.

In some cases, each past email record 116 returned by the query to the email record database is a record stored on the email record database that corresponds to an email that is determined to be related to the incoming email 114A. In some cases, the email security system 102 maintains an email record database that indicates a maliciousness prediction for a past email. In some cases, a record of the database is associated with a corresponding past email and indicates at least one of the following: (i) a sender associated with the corresponding email, (ii) a receiver associated with the corresponding email, (iii) a timestamp associated with the corresponding email, or (iv) a maliciousness prediction associated with the corresponding email. In some cases, after the email security system 102 receives a first email, the email security system determines a maliciousness prediction for the first email and subsequently stores a new record in the database that indicates the maliciousness prediction of the first email (e.g., along with the sender of the first email, the receiver of the first email, and/or the timestamp of the first email). Accordingly, in some cases, the email record database is a repository of previously-determined maliciousness predictions that the email security system 102 can use to update a maliciousness prediction for a future email.

In some cases, the email record database is updated each time an email is received. In some cases, after an email is received, the email security system 102 determines a maliciousness prediction for the received email and stores the maliciousness prediction in the email record database (e.g., as part of a record associated with the received email). In some cases, the email record database is updated periodically. In some cases, after an email is received, the email security system stores the email in an email repository database. In some cases, periodically (e.g., every minute), the email security system retrieves an email that is stored in the email repository database, determines a maliciousness prediction for the retrieved email, stores the determined maliciousness prediction in the email record database, and removes the noted email from the email repository database.

In some cases, the email security system 102 enforces a policy to manage the number of records stored on the email record database by removing records when one or more predefined removal criteria are met. For example, in some cases, the email record database may only include records corresponding to past emails that are determined to be received after a defined time in the past (e.g., three months before a current time associated with the determination). In some cases, when the email security system determines that a first email is received at a first time that is earlier than a defined time in the past (e.g., three months before a current time associated with the determination), the email security system removes the record associated with the first email from the email record database. As another example, in some cases, the email record database may only include up to N (e.g., 10,000) records, such that adding an (N+1)th record requires removing the record corresponding to an email that is determined to be received earlier than all other emails associated with the other (N−1) records in the database.

As further depicted in FIG. 1, at operation (4), the email security system 102 determines a maliciousness verdict for the incoming email 114A. As described above, in some cases, if the maliciousness prediction for the incoming email 114A, as determined in operation (2), satisfies a maliciousness pattern associated with maliciousness emails, then the email security system 102 may skip operation (3) and instead perform operation (4) in a manner configured to determine a maliciousness verdict for the incoming email 114A based on the maliciousness prediction for the incoming email 114A as determined in operation (2). In some cases, if the maliciousness prediction for the incoming email 114A, as determined in operation (2), fails to satisfy a maliciousness pattern associated with maliciousness emails, then the email security system 102 determines the maliciousness verdict for the incoming email 114A based on at least one of the maliciousness predictions determined for the incoming email 114A at operation (2) or the maliciousness predictions of the past email records 116 retrieved at operation (3).

In some cases, the email security system 102 combines the malicious prediction for the incoming email 114A with the maliciousness predictions described by the past email records 116 to determine a maliciousness verdict for the incoming email 114A. For example, as depicted in FIG. 1, the email security system 102 may provide the maliciousness prediction 118 for the incoming email 114A and the maliciousness predictions 120 determined from the past email records 116 to a verdict determination model 122 (e.g., a trained neural network model) that is configured to determine a maliciousness verdict 124 for the incoming email 114A. In some cases, after providing the maliciousness prediction 118 for the incoming email 114A and the maliciousness predictions 120 determined from the past email records 116 as inputs to the verdict determination model 122, the email security system 102 receives the maliciousness verdict 124 for the incoming email 114A as the output of the verdict determination model 122. In some cases, the maliciousness verdict 124 for the incoming email 114A indicates whether the email is predicted to be associated with a malicious email attack and/or a recommended remedial action for the email security system to perform in relation to the incoming email 114A. Examples of remedial actions include blocking the incoming email 114A from being displayed in an inbox of the receiver, harvesting data about the incoming email 114A to generate a maliciousness detector model, storing attacker data associated with the incoming email 114A in a blacklist associated with the email security system, reporting attacker data associated with the incoming email 114A to authorities, and/or the like.

In some cases, to determine the maliciousness verdict for the incoming email 114A based on the maliciousness predictions 120 for related emails as retrieved from the email record database, the email security system 102 first orders the maliciousness predictions 120 (e.g., based on a temporal sequence of the receipt times associated with the corresponding emails) and then provides the maliciousness predictions 120 based on a position of each maliciousness prediction in the determined order. For example, inputs to the verdict determination model 122 may include, for each maliciousness prediction associated with a respective related email, the maliciousness prediction and a position indicator associated with the maliciousness prediction. The position indicator may be determined based on a position of the maliciousness prediction in the determined order of the maliciousness predictions 120. Accordingly, in some cases, in determining the maliciousness verdict 124, the verdict determination model 122 may capture predictive insights from not just past related emails but also from the sequential ordering of the past related emails.

As described above, the architecture 100 depicted in FIG. 1 enables at least two distinct software architectures for the email security system 102. In accordance with a first software architecture, receiving an incoming email 114A from the email service platform triggers at least one of the following operations: (i) determining the maliciousness prediction for the incoming email 114A, (ii) storing the maliciousness prediction for the incoming email 114A in the email record database, (iii) retrieving past email records 116 related to the incoming email 114A from the email record database, or (iv) determining the maliciousness verdict 124 based on the maliciousness prediction determined in (i) and the maliciousness predictions corresponding to the records 116 retrieved in (iv). In accordance with a second architecture, receiving an incoming email 114A triggers determining a maliciousness prediction for the incoming email 114A and storing the determined prediction in the email record database. In some cases, in accordance with the second architecture, at least one of the following operations may be performed periodically: (i) retrieving the maliciousness prediction for the incoming email 114A from the email record database, (ii) retrieving the maliciousness predictions for emails that are determined to be related to the incoming email 114A, and (iii) combining the maliciousness predictions obtained in (i)-(ii) to determine the maliciousness verdict for incoming email 114A.

FIG. 2 illustrates a component diagram 200 of the example email security system 102 of FIG. 1. As depicted in FIG. 1, the email security system 102 may include one or more hardware processors 202 (processors), which may be one or more devices configured to execute one or more stored instructions. The processor(s) 202 may comprise one or more cores. Further, the email security system 102 may include one or more network interfaces 204 configured to provide communications between the email security system 102 and other devices, such as the sending device(s) 104, receiving devices 106, and/or other systems or devices associated with an email service providing the email communications. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The email security system 102 may also include computer-readable media 206 that stores various executable components (e.g., software-based components, firmware-based components, etc.). The computer-readable-media 206 may store components to implement functionality described herein. While not illustrated, the computer-readable media 206 may store one or more operating systems utilized to control the operation of the one or more devices that comprise the email security system 102. According to one embodiment, the operating system comprises the LINUX operating system. According to another embodiment, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the email security system 102 may include storage 222 which may comprise one, or multiple, repositories or other storage locations for persistently storing and managing collections of data such as databases, simple files, binary, and/or any other data. The storage 222 may include one or more storage locations that may be managed by one or more storage/database management systems. For example, the storage 222 may store a set of maliciousness pattern 216 that can be used to determine whether a maliciousness prediction having a particular format indicates that the corresponding email is malicious. As another example, the storage 222 may store a set of maliciousness detector models 218 used to determine the maliciousness prediction for an email. As a further example, the storage 222 may store an email record database 220 that stores records that indicate previously-determined maliciousness predictions for at least a subset of past emails (e.g., for past emails whose receipt time falls within a recent period).

The computer-readable media 206 may include portions, or components, that configure the email security system 102 to perform various operations described herein. For example, a prediction component 208 may be configured to determine a maliciousness prediction for an email. As another example, the database management component 210 may be configured to store maliciousness predictions on the email record database 220 and/or enforce a policy to manage the number of records stored on the email record database 220 (e.g., to remove, from the email record database, records pertaining to emails whose receipt times falls outside a recent period). As an additional example, the verdict determination component 212 is configured to determine a maliciousness verdict for a first email based on at least one of the maliciousness prediction for the email and/or a maliciousness prediction for a second email that is determined to be related to the first email. As a farther example, the action component 214 is configured to determine whether to generate and/or perform a recommended remedial action for an email based on the maliciousness verdict for the email. In some cases, the maliciousness verdict for an email indicates whether the email is predicted to be associated with a malicious email attack and/or a recommended remedial action for the email security system to perform in relation to the email. Examples of remedial actions include blocking the email from being displayed in an inbox of the receiver, harvesting data about a malicious email to generate a maliciousness detector model, storing attacker data associated with a malicious email in a blacklist associated with the email security system, reporting attacker data associated with a malicious email to authorities, and/or the like.

FIG. 3 is a flowchart diagram of an example process 300 for routing an incoming email by determining a maliciousness verdict based on receiving the incoming email. As depicted in FIG. 3, at operation 302, the process 300 includes receiving an incoming email from an email service platform.

At operation 304, the process 300 includes determining a maliciousness prediction for the incoming email. In some cases, the maliciousness prediction of a corresponding email indicates a likelihood that a corresponding email is malicious. For example, the maliciousness prediction may indicate a predicted likelihood that the corresponding email is malicious as determined using one or more maliciousness detector models.

At operation 306, the process 300 includes storing the maliciousness prediction in an email record database. In some cases, a record of the database is associated with a corresponding email and indicates at least one of the following: (i) a sender associated with the corresponding email, (ii) a receiver associated with the corresponding email, (iii) a timestamp associated with the corresponding email, or (iv) a maliciousness prediction associated with the corresponding email. In some cases, after the email security system receives a first email, the email security system determines a maliciousness prediction for the first email and subsequently stores a new record in the database that indicates the maliciousness prediction of the first email (e.g., along with the sender of the first email, the receiver of the first email, and/or the timestamp of the first email).

At operation 308, the process 300 includes determining whether the email record database includes a past email record for the incoming email. In some cases, a past email record associated with the incoming email is a record of the email record database that is associated with an email determined to be related to the incoming email. In some cases, two emails are determined to be related if they are sent from the same sender and to the same receiver.

At operation 310, the process 300 includes determining a maliciousness verdict for the incoming email based on the maliciousness prediction for the incoming email based on (e.g., in response to) determining that the incoming email is not associated with any past email records. In some cases, if an email security system determines that an incoming email is not associated with any past email records, the email security system determines that the incoming does not have any related maliciousness predictions for related emails. Accordingly, in some cases, the email security system may determine the maliciousness verdict for the incoming email based on the maliciousness prediction for the incoming email and without using any maliciousness predictions associated with other emails.

At operation 312, the process 300 includes determining one or more related maliciousness predictions associated with the incoming email based on determining that the incoming email is not associated with one or more past email records. In some cases, the related maliciousness predictions include the maliciousness predictions indicated by the one or more past email records. In some cases, the related maliciousness predictions are associated with past email records that are determined to be related to the incoming email.

At operation 314, the process 300 includes determining a maliciousness verdict based on the one or more related maliciousness predictions determined in operation 312 based on determining that the incoming email is not associated with one or more past email records. In some cases, if the email security system determines that the incoming email is associated with one or more related past emails and thus one or more past email records, the email security system combines the previously-determined maliciousness predictions for those related past emails as indicated by the past email records to determine the maliciousness verdict. In some cases, if the email security system determines that the incoming email is associated with one or more related past emails and thus one or more past email records, the email security system combines the previously-determined maliciousness predictions for those related past emails as indicated by the past email records along with the maliciousness prediction for the incoming email to determine the maliciousness verdict.

At operation 316, the process 300 includes routing the incoming email based on the maliciousness verdict. In some cases, operation 316 is performed based on the determination of the maliciousness verdict for the incoming email at operation 310. In some cases, operation 316 is performed based on the determination of the maliciousness verdict for the incoming email at operation 314. In some cases, the maliciousness verdict for the incoming email indicates whether the incoming email is associated with a recommended remedial action of blocking. In some cases, if the maliciousness verdict indicates that the incoming email is associated with a recommended remedial action of blocking, an email security system routes the incoming email by blocking the incoming email from being sent to the receiver. In some cases, if the maliciousness verdict indicates that the incoming email is not associated with a recommended remedial action of blocking, an email security system routes the incoming email by sending the incoming email to the receiver.

FIG. 4 is a flowchart diagram of an example process 400 for routing an incoming email by determining a maliciousness verdict based on detecting a periodic trigger. As depicted in FIG. 4, at operation 402, the process 400 includes receiving an incoming email from an email service platform.

At operation 404, the process 400 includes determining a maliciousness prediction for the incoming email. In some cases, the maliciousness prediction of a corresponding email indicates a likelihood that a corresponding email is malicious. For example, the maliciousness prediction may indicate a predicted likelihood that the corresponding email is malicious as determined using one or more maliciousness detector models.

At operation 406, the process 400 includes storing the maliciousness prediction in an email record database. In some cases, a record of the database is associated with a corresponding email and indicates at least one of the following: (i) a sender associated with the corresponding email, (ii) a receiver associated with the corresponding email, (iii) a timestamp associated with the corresponding email, or (iv) a maliciousness prediction associated with the corresponding email. In some cases, after the email security system receives a first email, the email security system determines a maliciousness prediction for the first email and subsequently stores a new record in the database that indicates the maliciousness prediction of the first email (e.g., along with the sender of the first email, the receiver of the first email, and/or the timestamp of the first email).

At operation 406, the process 400 includes storing the maliciousness prediction in an email record database. In some cases, a record of the database is associated with a corresponding email and indicates at least one of the following: (i) a sender associated with the corresponding email, (ii) a receiver associated with the corresponding email, (iii) a timestamp associated with the corresponding email, or (iv) a maliciousness prediction associated with the corresponding email. In some cases, after the email security system receives a first email, the email security system determines a maliciousness prediction for the first email and subsequently stores a new record in the database that indicates the maliciousness prediction of the first email (e.g., along with the sender of the first email, the receiver of the first email, and/or the timestamp of the first email).

At operation 408, the process 400 includes detecting a periodic trigger. In some cases, a trigger routine periodically (e.g., every thirty seconds) generates an indication and provides the indication to a component of an email security system that is configured to determine at least one maliciousness prediction. In some cases, the component is configured to determine a maliciousness prediction for each email for which no maliciousness prediction has not been previously determined based on receiving the indication.

At operation 410, the process 400 includes determining whether the email record database includes a past email record for the incoming email based on detecting the periodic trigger. In some cases, a past email record associated with the incoming email is a record of the email record database that is associated with an email determined to be related to the incoming email. In some cases, two emails are determined to be related if they are sent by the same sender and to the same receiver.

At operation 412, the process 400 includes determining a maliciousness verdict for the incoming email based on the maliciousness prediction for the incoming email based on (e.g., in response to) determining that the incoming email is not associated with any past email records. In some cases, if an email security system determines that an incoming email is not associated with any past email records, the email security system determines that the incoming does not have any related maliciousness predictions for related emails. Accordingly, in some cases, the email security system may determine the maliciousness verdict for the incoming email based on the maliciousness prediction for the incoming email and without using any maliciousness predictions associated with other emails.

At operation 414, the process 400 includes determining one or more related maliciousness predictions associated with the incoming email based on determining that the incoming email is not associated with one or more past email records. In some cases, the related maliciousness predictions include the maliciousness predictions indicated by the one or more past email records. In some cases, the related maliciousness predictions are associated with past email records that are determined to be related to the incoming email.

At operation 416, the process 400 includes determining a maliciousness verdict based on the one or more related maliciousness predictions determined in operation 414 based on determining that the incoming email is not associated with one or more past email records. In some cases, if the email security system determines that the incoming email is associated with one or more related past emails and thus one or more past email records, the email security system combines the previously-determined maliciousness predictions for those related past emails as indicated by the past email records to determine the maliciousness verdict. In some cases, if the email security system determines that the incoming email is associated with one or more related past emails and thus one or more past email records, the email security system combines the previously-determined maliciousness predictions for those related past emails as indicated by the past email records along with the maliciousness prediction for the incoming email to determine the maliciousness verdict.

At operation 418, the process 400 includes routing the incoming email based on the maliciousness verdict. In some cases, operation 418 is performed based on the determination of the maliciousness verdict for the incoming email at operation 412. In some cases, operation 418 is performed based on the determination of the maliciousness verdict for the incoming email at operation 416. In some cases, the maliciousness verdict for the incoming email indicates whether the incoming email is associated with a recommended remedial action of blocking. In some cases, if the maliciousness verdict indicates that the incoming email is associated with a recommended remedial action of blocking, an email security system routes the incoming email by blocking the incoming email from being sent to the receiver. In some cases, if the maliciousness verdict indicates that the incoming email is not associated with a recommended remedial action of blocking, an email security system routes the incoming email by sending the incoming email to the receiver.

Figure 5:
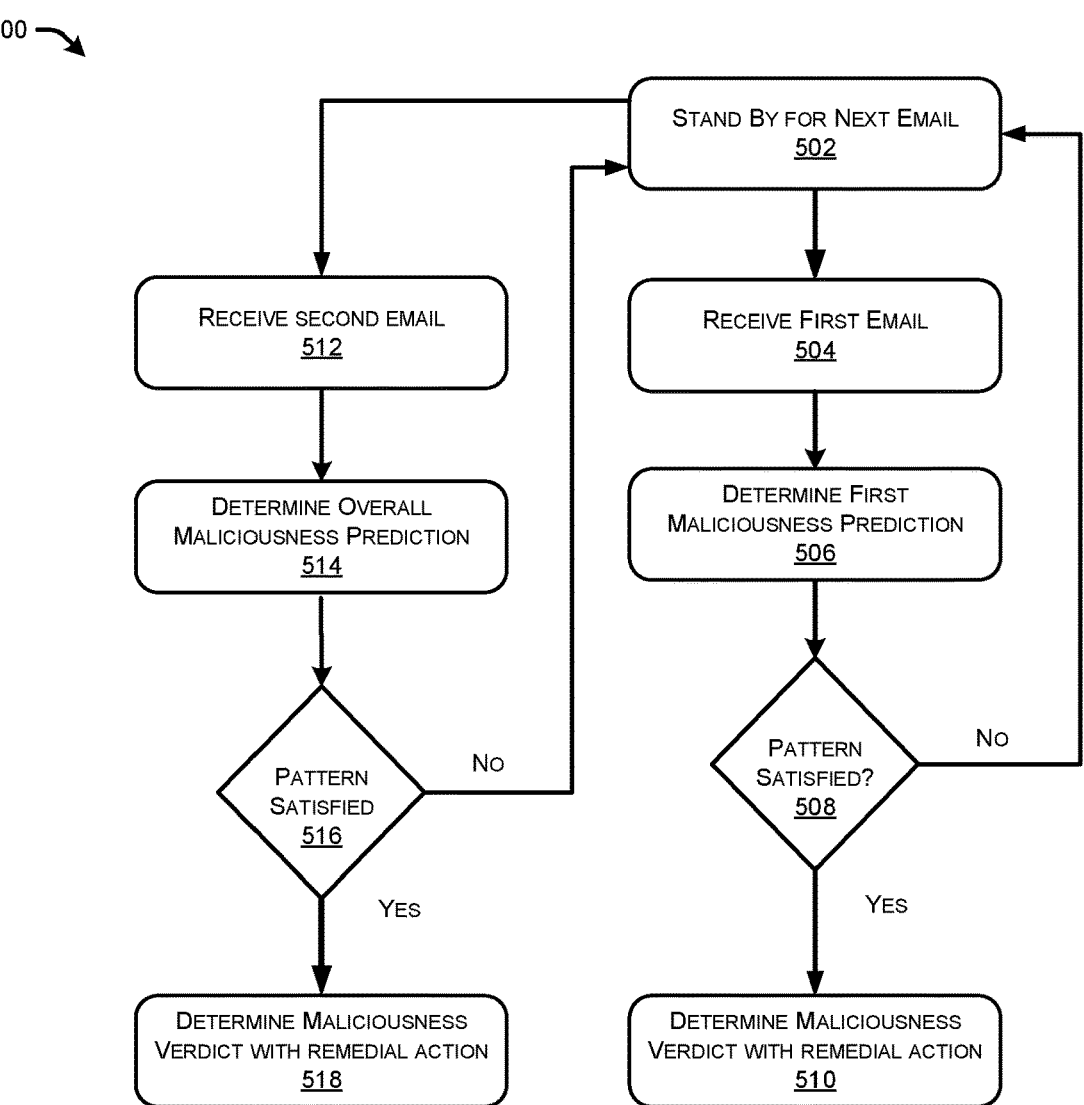
FIG. 5 is a flowchart diagram of an example process for determining a maliciousness verdict for a first email.

FIG. 5 is a flowchart diagram of an example process 500 for determining a maliciousness verdict for a first email. At operation 502, the process 500 includes standing by for the next incoming email, which is then received at operation 504.

At operation 506, the process 500 includes receiving a first maliciousness prediction for the first email. The maliciousness prediction may indicate a predicted likelihood that the corresponding email is malicious as determined using one or more maliciousness detector models.

At operation 508, the process 500 includes determining whether the first maliciousness prediction satisfies a maliciousness pattern. In some cases, if the first malicious prediction does not satisfy the maliciousness pattern, the process 500 returns to operation 502 to stand by for the next email. In some cases, if the first malicious prediction does not satisfy the maliciousness pattern, the first maliciousness prediction is stored in an email record database, and the process 500 returns to operation 502 to stand by for the next email.

At operation 510, the process 500 includes determining a maliciousness verdict for the first email based on determining that the first malicious pattern satisfies the malicious pattern. In some cases, the maliciousness verdict indicates that the first email is malicious. In some cases, the maliciousness verdict is associated with a recommended remedial action. In some cases, the maliciousness verdict is determined based on the first maliciousness prediction. In some cases, the maliciousness verdict is determined based on the determination that the first maliciousness prediction satisfies the maliciousness pattern.

At operation 512, the process 500 includes receiving a second email. In some cases, the second email is received at a second time that is after a first time associated with receipt of the first email. In some cases, the first time is within a threshold period of time before the second time. In some cases, the first email and the second email are both sent from the same sender and to the receiver.

At operation 514, the process 500 includes determining an overall maliciousness prediction for the combination of the first email and the second email. In some cases, the overall maliciousness prediction indicates an overall likelihood that the combination of the first email and the second email is malicious. In some cases, the overall maliciousness prediction is determined by combining the first maliciousness prediction for the first email and a second maliciousness prediction for the second email.

At operation 516, the process 500 includes determining whether the overall maliciousness prediction satisfies the maliciousness pattern. In some cases, if the overall malicious prediction does not satisfy the maliciousness pattern, the process 500 returns to operation 502 to stand by for the next email. In some cases, if the overall malicious prediction does not satisfy the maliciousness pattern, the overall maliciousness prediction is stored in the email record database, and the process 500 returns to operation 502 to stand by for the next email.

At operation 518, the process 500 includes determining a maliciousness verdict for the second email (e.g., for the combination of the first email and/or the second email) based on determining that the overall malicious pattern satisfies the malicious pattern. In some cases, the maliciousness verdict indicates that the second email and/or the first email are malicious. In some cases, the maliciousness verdict is associated with a recommended remedial action. In some cases, the maliciousness verdict is determined based on the first maliciousness prediction. In some cases, the maliciousness verdict is determined based on the determination that the overall maliciousness prediction satisfies the maliciousness pattern.

FIG. 6 is a flowchart diagram of an example process 600 of routing an email based on past email records associated with a sender-receiver combination for the email. As depicted in FIG. 6, at operation 602, the process 600 includes identifying a sender-receiver combination. In some cases, the sender-receiver combination includes a sender and a receiver of an email (e.g., an incoming email). In some cases, when an email has R recipients, R sender-receiver combinations can be determined based on the sender and the receiver list of email. In some case, when an email has R recipients, operations 602-608 can be determined R times and for R sender-receiver combinations associated with the email to determine R maliciousness verdicts for the email. In some cases, the R maliciousness verdicts for the email can be combined to determine an overall maliciousness verdict for the email. In some cases, the overall maliciousness verdict can be used to route the email.

At operation 604, the process 600 includes querying past email records associated with the sender-receiver combination. In some cases, an email record database is queried to retrieve all records associated with emails sent by the sender in the sender-receiver combination to the receiver in the sender-receiver combination.

At operation 606, the process 600 includes retrieving maliciousness predictions associated with the past email records. In some cases, each past email record indicates a maliciousness prediction that is retrieved at operation 606.

At operation 608, the process 600 includes combining the maliciousness predictions retrieved at operation 606 to determine a maliciousness verdict for the sender-receiver combination. In some cases, the maliciousness predictions retrieved at operation 606 are combined with the maliciousness prediction of an incoming email to determine maliciousness verdict for the sender-receiver combination.

Figure 7:
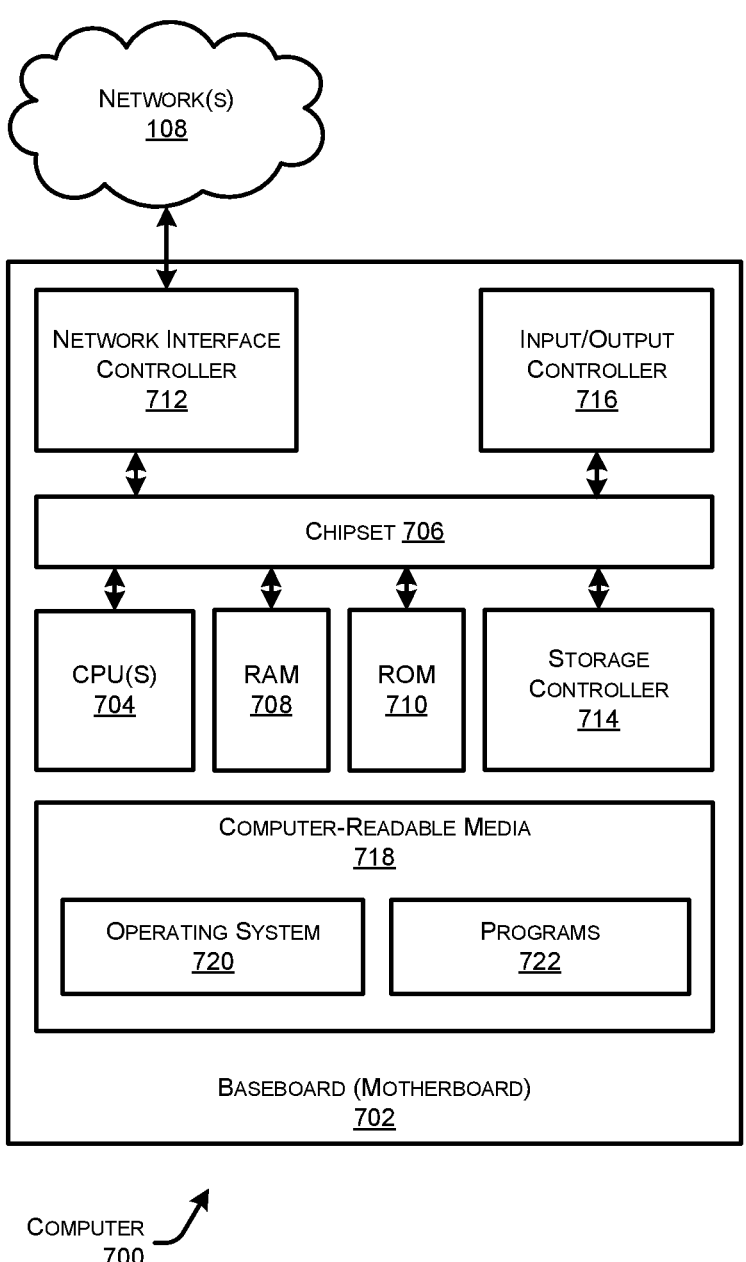
FIG. 7 is a computer architecture diagram showing an illustrative computer hardware architecture for implementing a computing device that can be utilized to implement aspects of the various technologies presented herein.

At operation 610, the process 600 includes routing an email based on the maliciousness verdict. In some cases, the maliciousness verdict for the email indicates whether the incoming email is associated with a recommended remedial action of blocking. In some cases, if the maliciousness verdict indicates that the email is associated with a recommended remedial action of blocking, an email security system routes the incoming email by blocking the incoming email from being sent to the receiver. In some cases, if the maliciousness verdict indicates that the email is not associated with a recommended remedial action of blocking, an email security system routes the email by sending the email to the receiver. FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The computer 700 may, in some examples, correspond to a physical server that is included in the email security-system 102 described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 108. The chipset 706 can include functionality for providing network connectivity through a NIC 712, such as a gigabit Ethernet adapter. The NIC 712 is capable of connecting the computer 700 to other computing devices over the network 108. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations are performed by devices in a distributed application architecture, and or any components included therein, may be supported by one or more devices similar to computer 700. Stated otherwise, some or all of the operations performed by the email security system 102, and or any components included therein, may be performed by one or more computer devices 700 operating in any system or arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-8. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for malicious email detection, the method comprising:

receiving a first email from a first sender to a first receiver, wherein the first email is an incoming email;

determining a first maliciousness prediction that indicates a first determination about whether the first email is malicious;

based on determining that the first maliciousness prediction indicates that the first email is non-malicious, determining an overall maliciousness prediction indicating whether a temporal sequence of past related emails is malicious, wherein each of the temporal sequence of past related emails is from the first sender to the first receiver, wherein the temporal sequence of past related emails is based on timestamp, and wherein determining the overall maliciousness prediction comprises:

determining the temporal sequence of past related emails, the temporal sequence of past related emails comprising the first email, a second email, and a third email, and wherein the second email and the third email are past emails from the first sender to the first receiver;

determining or receiving a second maliciousness prediction that indicates a second determination about whether the second email is malicious;

determining or receiving a third maliciousness prediction that indicates a third determination about whether the third email is malicious;

determining that the second email and the third email were received within a threshold period of a receipt time of the first email;

based at least in part on the second email and the third email being received from the first sender by the first receiver within the threshold period of time, providing, to a machine learning model, input data representing:

the first maliciousness prediction, the second maliciousness prediction, and the third maliciousness prediction, a first position indicator representing a first position of the first email in the temporal sequence of past related emails, a second position indicator representing a second position of the second email in the temporal sequence of past related emails; and a third position indicator representing a third position of the third email in the temporal sequence of past related emails; and receiving, from the machine learning model, output data representing the overall maliciousness prediction; and determining that the overall maliciousness prediction satisfies a maliciousness pattern.

2. The method of claim 1, further comprising:

based at least in part on the overall maliciousness prediction satisfying the maliciousness pattern, determining a maliciousness verdict that indicates a remedial action for at least one of the first email, the second email, or the third email.

3. The method of claim 1, further comprising:

storing the first maliciousness prediction in a first record of a database, wherein the first record indicates the first maliciousness prediction, the first sender, and the first receiver.

4. The method of claim 3, further comprising:

based on determining that the second email is from the first sender to the first receiver, querying the database in accordance with the first sender and the first receiver to retrieve the first record; and extracting the first maliciousness prediction from the first record.

5. The method of claim 1, wherein:

the second email is sent from the first sender to the first receiver and a second receiver, and the method further comprises:

based at least in part on the overall maliciousness prediction satisfying the maliciousness pattern, determining a maliciousness verdict that indicates a remedial action for the second email, wherein the remedial action comprises blocking the second email from being provided to the first receiver and the second receiver.

6. A system comprising:

one or more processors; and one or more non-transitory computer-readable media storing computer-executable instructions that, when executed by the one or more processors, cause the one or more processors to perform operations comprising:

receiving a first email from a first sender to a first receiver, wherein the first email is an incoming email;

determining a first maliciousness prediction that indicates a first determination about whether the first email is malicious;

based on determining that the first maliciousness prediction indicates that the first email is non-malicious, determining an overall maliciousness prediction indicating whether a temporal sequence of past related emails is malicious, wherein each of the temporal sequence of past related emails is from the first sender to the first receiver, and wherein determining the overall maliciousness prediction comprises:

determining the temporal sequence of past related emails, the temporal sequence of past related emails comprising the first email, a second email, and a third email, and wherein the second email and the third email are past emails from the first sender to the first receiver;

determining or receiving a second maliciousness prediction that indicates a second determination about whether the second email is malicious;

determining or receiving a third maliciousness prediction that indicates a third determination about whether the third email is malicious;

determining that the second email and the third email were received within a threshold period of a receipt time of the first email;

based at least in part on the second email and the third email being received from the first sender by the first receiver within the threshold period of time, providing, to a machine learning model, input data representing:

the first maliciousness prediction, the second maliciousness prediction, and the third maliciousness prediction, a first position indicator representing a first position of the first email in the temporal sequence of past related emails, a second position indicator representing a second position of the second email in the temporal sequence of past related emails; and a third position indicator representing a third position of the third email in the temporal sequence of past related emails; and receiving, from the machine learning model, output data representing the overall maliciousness prediction; and determining that the overall maliciousness prediction satisfies a maliciousness pattern.

7. The system of claim 6, further comprising:

based at least in part on the overall maliciousness prediction satisfying the maliciousness pattern, determining a maliciousness verdict that indicates a remedial action for at least one of the first email, the second email, or the third email.

8. The system of claim 6, further comprising:

storing the first maliciousness prediction in a first record of a database, wherein the first record indicates the first maliciousness prediction, the first sender, and the first receiver.

9. The system of claim 8, the operations further comprising:

determining that the second email is from the first sender to the first receiver;

based on determining that the second email is from the first sender to the first receiver, querying the database in accordance with the first sender and the first receiver to retrieve the first record; and extracting the first maliciousness prediction from the first record.

10. The system of claim 6, wherein:

the second email is sent from the first sender to the first receiver and a second receiver, and the operations further comprise:

based at least in part on the overall maliciousness prediction satisfying the maliciousness pattern, determining a maliciousness verdict that indicates a remedial action for the second email, wherein the remedial action comprises blocking the second email from being provided to the first receiver and the second receiver.

11. One or more non-transitory computer-readable media storing computer-executable instructions that, when executed by one or more processors, cause the one or more processors to perform operations comprising:

receiving a first email from a first sender to a first receiver, wherein the first email is an incoming email;

determining a first maliciousness prediction that indicates a first determination about whether the first email is malicious;

based on determining that the first maliciousness prediction indicates that the first email is non-malicious, determining an overall maliciousness prediction indicating whether a temporal sequence of past related emails is malicious, wherein each of the temporal sequence of past related emails is from the first sender to the first receiver, and wherein determining the overall maliciousness prediction comprises:

determining the temporal sequence of past related emails, the temporal sequence of past related emails comprising the first email, a second email, and a third email, and wherein the second email and the third email are past emails from the first sender to the first receiver;

determining or receiving a second maliciousness prediction that indicates a second determination about whether the second email is malicious;

determining or receiving a third maliciousness prediction that indicates a third determination about whether the third email is malicious;

determining that the second email and the third email were received within a threshold period of a receipt time of the first email;

based at least in part on the second email and the third email being received from the first sender by the first receiver within the threshold period of time, providing, to a machine learning model, input data representing:

the first maliciousness prediction, the second maliciousness prediction, and the third maliciousness prediction, a first position indicator representing a first position of the first email in the temporal sequence of past related emails, a second position indicator representing a second position of the second email in the temporal sequence of past related emails; and a third position indicator representing a third position of the third email in the temporal sequence of past related emails; and receiving, from the machine learning model, output data representing the overall maliciousness prediction; and determining that the overall maliciousness prediction satisfies a maliciousness pattern.

12. The one or more non-transitory computer-readable media of claim 11, further comprising:

based at least in part on the overall maliciousness prediction satisfying the maliciousness pattern, determining a maliciousness verdict that indicates a remedial action for at least one of the first email, the second email, or the third email.

13. The one or more non-transitory computer-readable media of claim 11, the operations further comprising:

storing the first maliciousness prediction in a first record of a database, wherein the first record indicates the first maliciousness prediction, the first sender, and the first receiver.

14. The one or more non-transitory computer-readable media of claim 13, the operations further comprising:

determining that the second email is from the first sender to the first receiver;

based on determining that the second email is from the first sender to the first receiver, querying the database in accordance with the first sender and the first receiver to retrieve the first record; and extracting the first maliciousness prediction from the first record.

15. The one or more non-transitory computer-readable media of claim 11, wherein:

the second email is sent from the first sender to the first receiver and a second receiver, and the operations further comprise:

based at least in part on the overall maliciousness prediction satisfying the maliciousness pattern, determining a maliciousness verdict that indicates a remedial action for the second email, wherein the remedial action comprises blocking the second email from being provided to the first receiver and the second receiver.

* * * * *